(12) United States Patent
Bettin

(10) Patent No.: US 9,371,108 B2
(45) Date of Patent: Jun. 21, 2016

(54) FOLDING DEVICE WITH LOCKING MEANS

(76) Inventor: Karsten Bettin, Hannover (DE)

( * ) Notice: Subject to any disclaimer, the term of this patent is extended or adjusted under 35 U.S.C. 154(b) by 357 days.

(21) Appl. No.: 14/232,258

(22) PCT Filed: Jul. 17, 2012

(86) PCT No.: PCT/DE2012/100216
§ 371 (c)(1),
(2), (4) Date: Jan. 11, 2014

(87) PCT Pub. No.: WO2013/013667
PCT Pub. Date: Jan. 31, 2013

(65) Prior Publication Data
US 2014/0140756 A1    May 22, 2014

(30) Foreign Application Priority Data

Jul. 26, 2011   (DE) .......................... 10 2011 052 134

(51) Int. Cl.
| | | |
|---|---|---|
| *F16C 11/10* | (2006.01) | |
| *B62K 15/00* | (2006.01) | |
| *B62K 19/18* | (2006.01) | |

(Continued)

(52) U.S. Cl.
CPC ............... *B62K 15/006* (2013.01); *B62K 19/18* (2013.01); *F16C 11/103* (2013.01); *E05D 11/1007* (2013.01); *F16B 7/0426* (2013.01); *Y10T 403/32532* (2015.01)

(58) Field of Classification Search
CPC ...... B62K 15/006; B62K 21/24; B62K 19/18; E05D 11/1007; Y10T 16/54; Y10T 16/540243; Y10T 16/54024; Y10T 16/5404; Y10T 16/54026; Y10T 403/32254; Y10T 403/32532; Y10T 403/32861; Y10T 403/32868; Y10T 403/32942; F16C 11/103

USPC ................ 74/551.3–551.7; 16/319, 324–326; 403/93, 322; 280/278, 287
See application file for complete search history.

(56) References Cited

U.S. PATENT DOCUMENTS

| | | | | |
|---|---|---|---|---|
| 3,345,092 A | * | 10/1967 | Athman .............. | F01N 13/1805 180/89.2 |
| 5,337,609 A | * | 8/1994 | Hsu ...................... | B62K 15/006 280/278 |
| 5,440,948 A | * | 8/1995 | Cheng .................. | B62K 15/006 280/278 |

(Continued)

FOREIGN PATENT DOCUMENTS

| | | |
|---|---|---|
| CN | 201254246 Y | 6/2009 |
| CN | 201520377 U | 7/2010 |

(Continued)

*Primary Examiner* — Robert Canfield
(74) *Attorney, Agent, or Firm* — Smartpat PLC

(57) ABSTRACT

The disclosure relates to a folding device with locking mechanism for connecting components which is intended for a bicycle and has, on one side, a swing-action articulation and, on the other side, a locking mechanism which contains a locking assembly, which is connected in a rotatable manner to a supporting element and is braced against a curved clamping surface of a clamping element arranged on the opposite side, the clamping surface running eccentrically in relation to the axis of rotation of the locking assembly. The extended axis of rotation of the locking assembly, in the locked state of the folding device, is located within the circle described by the radius of curvature of the clamping surface, and this allows a large clamping displacement. An adjusting nut adjusts the pressure to which the clamping surface is subjected in the locked state by the locking assembly.

11 Claims, 4 Drawing Sheets

(51) Int. Cl.
*E05D 11/10* (2006.01)
*F16B 7/04* (2006.01)

(56) References Cited

U.S. PATENT DOCUMENTS

| | | | | |
|---|---|---|---|---|
| 5,906,452 A | * | 5/1999 | Lee | B62K 15/006 280/278 |
| 6,523,223 B2 | | 2/2003 | Wang | |
| 6,827,518 B2 | * | 12/2004 | Hon | B62K 15/006 16/324 |
| 7,198,281 B2 | | 4/2007 | Huang | |
| 9,051,021 B2 | * | 6/2015 | Bettin | B62K 15/008 |
| 2010/0135715 A1 | * | 6/2010 | Huang | B62K 15/006 403/83 |
| 2014/0225346 A1 | * | 8/2014 | Bettin | B62K 15/008 280/236 |
| 2015/0232141 A1 | * | 8/2015 | Bettin | B62J 1/007 280/259 |

FOREIGN PATENT DOCUMENTS

| | | |
|---|---|---|
| CN | 201559768 U | 8/2010 |
| CN | 201580496 U | 9/2010 |
| CN | 201626517 U | 11/2010 |
| CN | 201626519 U | 11/2010 |
| CN | 201777358 U | 3/2011 |
| CN | 201800843 | 4/2011 |
| CN | 201800843 U | 4/2011 |
| TW | M291476 U | 6/2006 |
| TW | 200808608 A | 2/2008 |
| WO | WO2007113179 | 10/2007 |
| WO | WO2009152768 | 12/2009 |

* cited by examiner

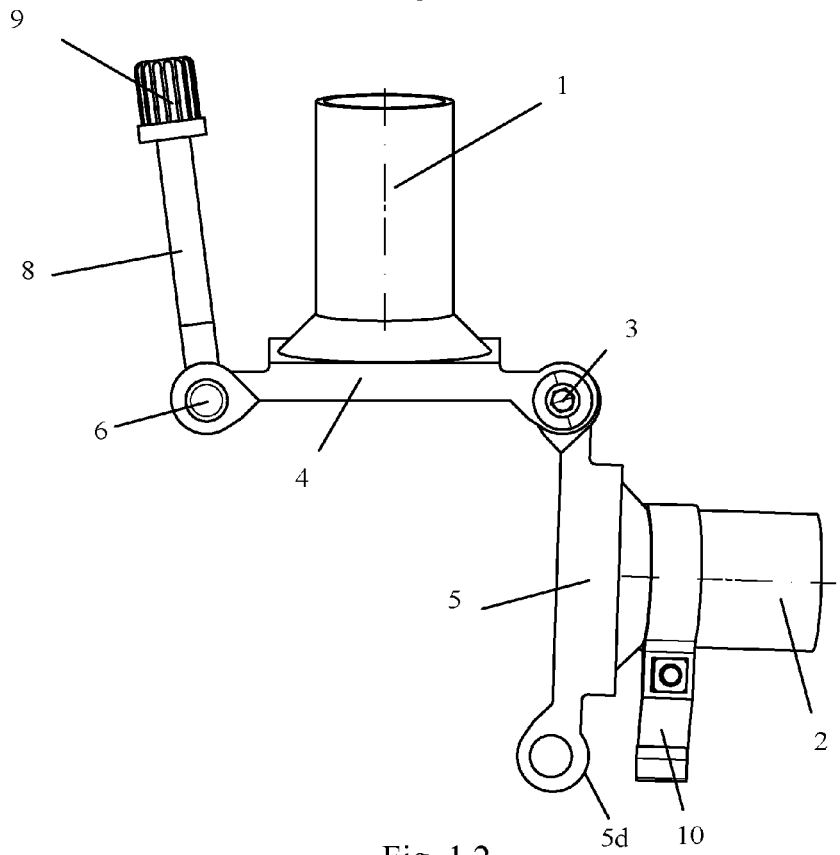
Fig. 1.1
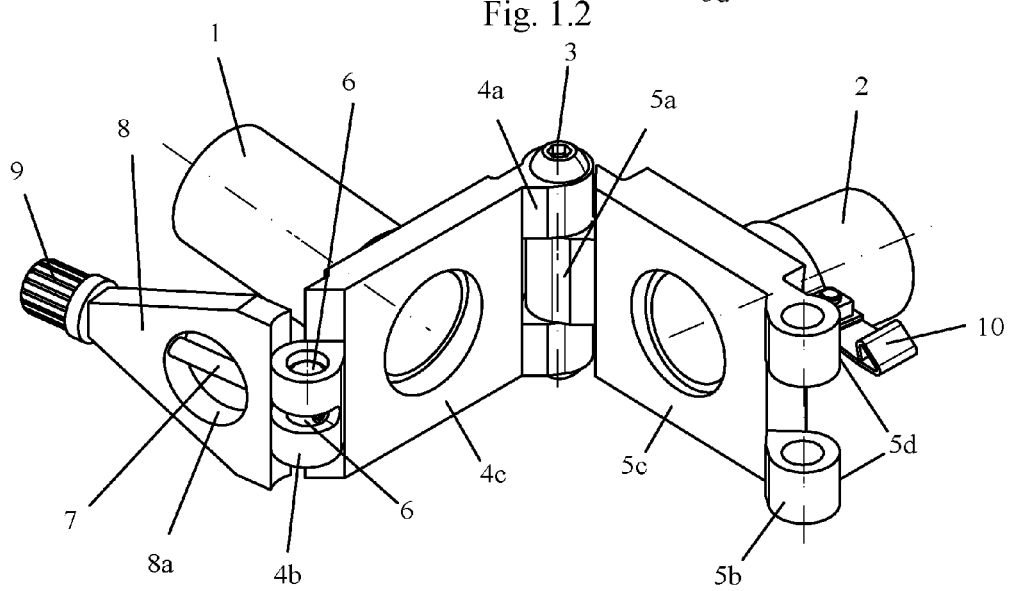
Fig. 1.2

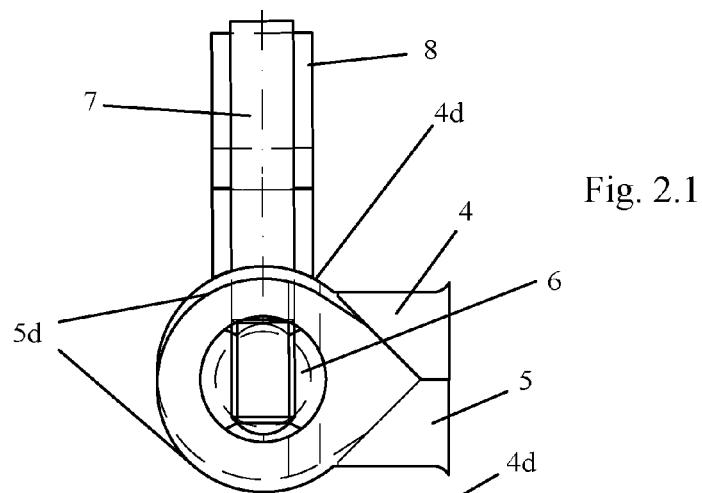
Fig. 2.1
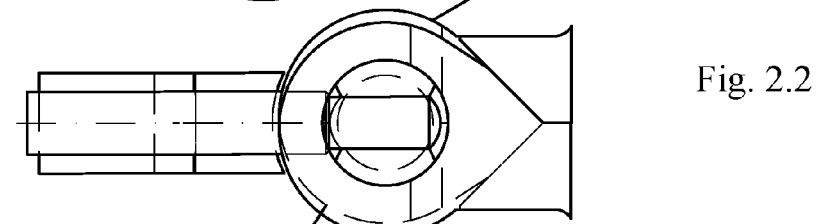
Fig. 2.2
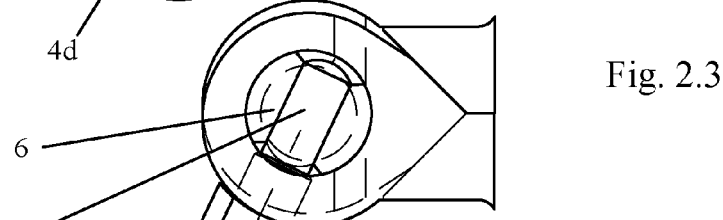
Fig. 2.3
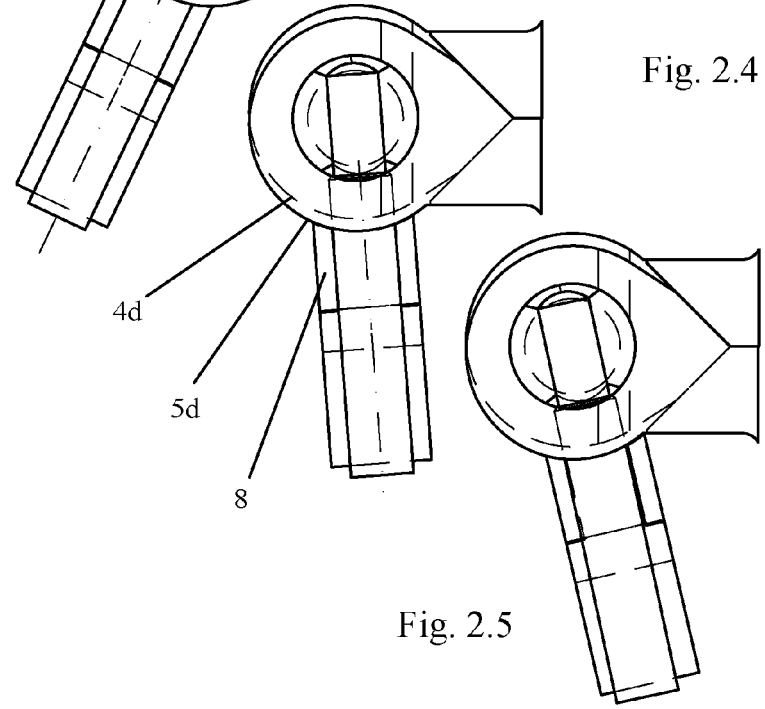
Fig. 2.4
Fig. 2.5

Fig. 3.1
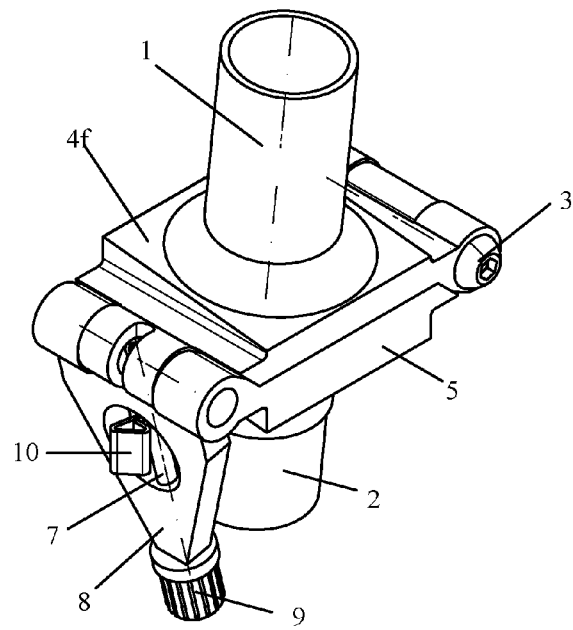
Fig. 3.2
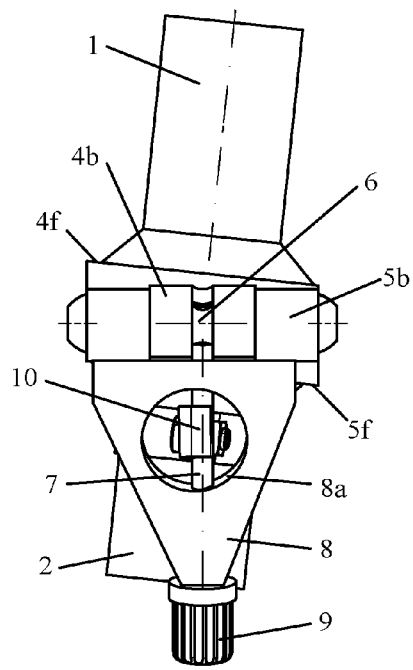
Fig. 3.3
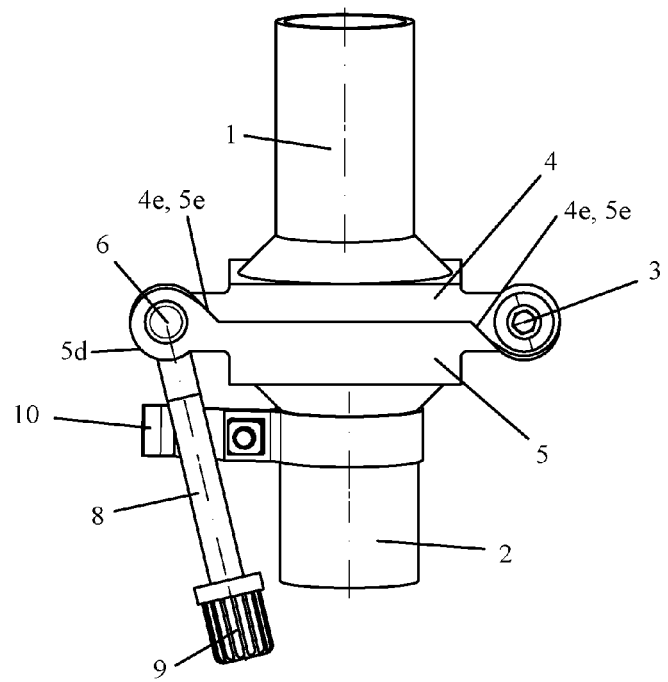

FOLDING DEVICE WITH LOCKING MEANS

TECHNICAL FIELD

The disclosure relates to a folding device with a locking mechanism for connecting two frame parts or two steering rod sections.

BACKGROUND

The description of the prior art refers to folding devices in which two parts, designated as A and B below, are rotatably interconnected on one of its side, while, on the other side, a locking mechanism is provided that acts only on this side and braces the two parts A and B relative to each other. In the process, the disclosure refers to those embodiments that exhibit, for the purpose of blocking, on the side of the locking mechanism inside one part, in the following inside part A, an axis on which a locking assembly having elements for locking is rotatably arranged, the two parts A and B being braced relative to each other by rotating a locking lever that is part of the locking assembly. Here, the locking assembly is supported on the axis arranged in part A, on which it is mounted rotatably, and pushes or pulls part B against part A. The disclosure finally refers to all embodiments that exhibit a clamping surface that runs eccentrically relative to the axis of rotation of the locking assembly, against which parts A and B are braced relative to each other.

In U.S. Pat. No. 6,523,223 B2, U.S. Pat. No. 7,198,281 B2, WO 2009/152 768 A1 and in the first embodiment of CN 201 626 517 U, the locking lever exhibits the clamping surface that runs eccentrically relative to its own axis of rotation.

It is a disadvantage of these embodiments, that the locking mechanism exhibits two different axes of rotation, i.e. the axis of rotation of the locking lever and the axis of rotation, that is different therefrom, of the locking assembly. Both rotary joints have to be manufactured having the corresponding strength and require a multiplicity of components. On top of this it is disadvantageous that the pressure that the eccentric clamping surface of the locking lever exerts on part B, cannot be set or can be set only within narrow limits independently of the closing angle of the locking lever owing to the construction.

It is a further disadvantage of the embodiment in WO 2009/152 768 A1, that the force that is exerted by the eccentric outer cylinder surface does not act directly, but laterally via the additional locking element on part B.

In WO 2007/113 179 A1, the locking lever likewise exhibits the clamping surface that runs eccentrically relative to its own axis of rotation. It is a disadvantage that the distance between the axis of rotation of the locking lever and the bolt in the locking state cannot be set and thus the force acting from the locking lever on part B is a direct function of the closing angle of the locking lever.

In CN 201 580 496 U, the locking assembly contains a clamping element that is supported on part B via a round bolt and rotates around the round bolt and exhibits a clamping surface that runs eccentrically relative to this axis of rotation. The clamping element is arranged rotatably in the locking lever.

It is again a disadvantage that the locking assembly exhibits two axes of rotation, i.e. the axis of rotation of the clamping element and the axis of rotation, that is different therefrom, of the locking assembly, both of which having to be designed with the corresponding strength and requiring a multiplicity of components.

In CN 201 559 768 U, a clamping element is rotatably arranged in part B and exhibits the clamping surface that runs eccentrically relative to the axis of rotation of the locking assembly. Here, too, it is a disadvantage that two axes of rotation are required that have to be designed with the corresponding strength, i.e. the axis of rotation, arranged in part B, of the clamping element and the axis of rotation, that is different therefrom and is arranged in part B, of the locking assembly.

CN 201 626 519 U, CN 201 254 246 Y and the second embodiment of CN 201 626 517 U reveal folding devices where part B exhibits a clamping surface on the side of the locking mechanism, which runs eccentrically relative to the axis of rotation of the locking assembly and is arranged firmly in part B, the locking mechanism exhibiting only one axis of rotation and the rotation of the locking assembly about its axis generating an increasing bracing between part A and part B.

However, it is a disadvantage of these embodiments a. that the radius of curvature of the clamping surface and the width, that can be used for clamping, of the clamping surface are so small owing to the construction, that the usable clamping displacement, i.e. the angle that the locking lever travels from the first contact of part B to the braced state, is very small, which places high requirements on the precise radial positioning of the clamping surface relative to the axis of rotation of the locking lever by means of the setting screws that are present and on the fixation of the clamped position of the locking lever. In the braced state, the closing angle of the locking lever has to be set very precisely and fixed by securing means and stops, so as to achieve and maintain the required bracing between parts A and B. As a consequence, the locking lever can also not be moved beyond the point of highest bracing to achieve a self-securing position, as else the clamping force would decrease considerably, b. that owing to the construction, parts A and B exhibit in their center additional elevations and oppositely-identical depressions so that parts A and B, in the folded state, can be positioned relative to each other with sufficient accuracy and mutual shifting of parts A and B relative to their common axis of rotation and/or orthogonally to their common axis of rotation is prevented. This has the disadvantage that parts A and B, owing to the construction, in each case have to exhibit a plate that connects the axis of rotation, arranged on one side, of the folding device to the clamping elements that are arranged on the opposite side (this is also valid for CN 201 580 496 U, CN 201 559 768 U), c. that parts A and B, owing to the construction, do not engage into each other on the side of the locking mechanism in the folded state and that therefore the locking lever must prevent the mutual displaceability of parts A and B in the direction of their common axis of rotation on this side in that the locking lever exhibits on both sides two arms having end faces that enclose one arm of part B and thus prevent the movability of part B toward part A in the direction of their common axis of rotation on the side of the clamping surfaces of the folding device, as a result of which however axial tolerances of the mounting of the locking lever can lead to instabilities of the clamping connection (is also valid for CN 201 559 768 U).

In CN 201 626 519 U and in the second embodiment of CN 201 626 517 U, there is arranged in part B a separate clamping element having a round head that functions as a clamping surface. An additional disadvantage of this embodiment that bracing between parts A and B only takes place by point contact of the clamping elements and that there is a risk that the two clamping elements evade the bracing action by slight lateral movements.

The two embodiments of the folding devices illustrated in CN 201 626 517 U serve to connect tubes of circular or at least oval cross-section. For this reason, they are not suitable for connecting parts having box-shaped profiles. In both embodiments of CN 201 626 517, parts A and B exhibit at their circumference additional upstanding walls that limit a mutual movement of parts A and B orthogonal to their axis of rotation. This again requires that, owing to the construction, parts A and B in each case have to exhibit a plate that connects the axis of rotation, arranged on one side, of the folding device to the clamping elements arranged on the opposite side.

SUMMARY

An improved folding device for connecting components of a frame or a steering rod has a clamping surface that is arranged eccentrically relative to the axis of rotation of a locking assembly and, when the locking assembly is rotated about its own axis, generates an increasing bracing between the two components without developing the disadvantages mentioned above. The presented folding device has the following characteristics:
- a) It exhibits the largest possible clamping displacement.
- b) The closing angle of the locking lever and the force with which the eccentric clamping surface generates the bracing, can be set independently of each other.
- c) The locking mechanism exhibits only one axis of rotation.
- d) For positioning the two components relative to each other, no additional elevations and depressions are necessary in the center of the two components.
- e) The precise positioning of the two components relative to each other is not a function of the design and positioning of the locking lever.

Further advantages of the improved device are:
- a) Connecting parts can be designed to be identical.
- b) Connecting parts can be manufactured from an identical extruded profile.
- c) The folding device is composed of few parts that are easy to manufacture.
- d) The parts to be connected do not have to be parallel to each other and also do not have to extend orthogonally to the axis of rotation of the folding device.
- e) The folding device can be used both for connecting tubes having round and also for connecting tubes having square profiles.

BRIEF DESCRIPTION OF THE DRAWINGS

FIG. 1.1 shows a top view of an exemplary embodiment of the locking device with locking mechanism for two tubular steering rod sections 1 and 2 that are interconnected by means of a folding articulation, in the open state.

FIG. 1.2 shows a perspective view of locking device as in FIG. 1.1.

FIGS. 2.1 to 2.5 show in the top view the steps for locking the closed folding device from the open state of the locking assembly in FIG. 2.1 to the locked state in FIG. 2.5.

FIG. 3.1 show a perspective view of the folding device as in FIG. 1.1 in the closed and locked state.

FIG. 3.2 is a side view of the folding device as in FIG. 3.1.

FIG. 3.3 is a top view of the folding device as in FIG. 3.1.

DETAILED DESCRIPTION

Figure 4:
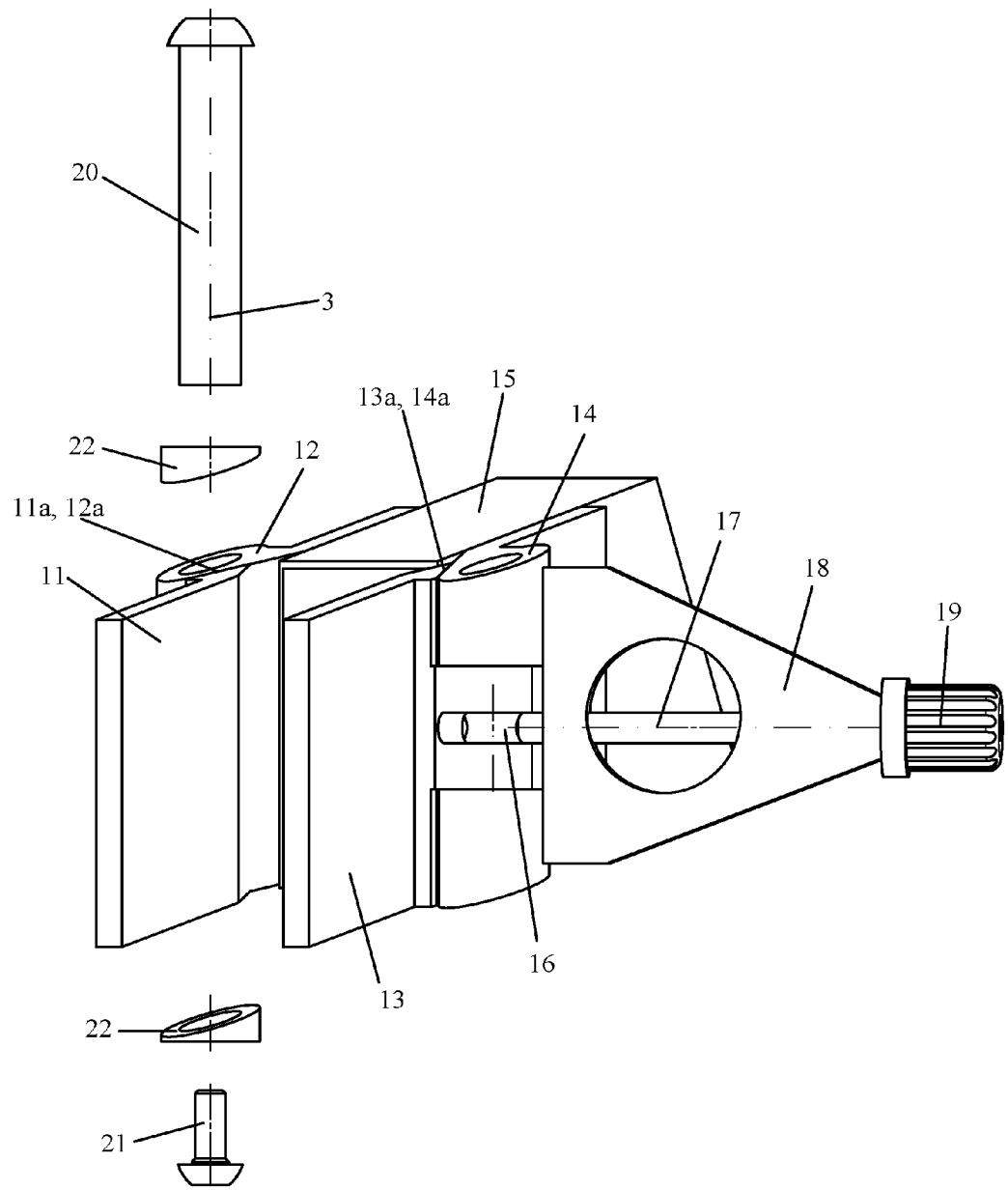
FIG. 4 shows a view of a further preferred embodiment of the folding device with locking mechanism having two separate hinge elements, a supporting element, and a clamping element that are connected to two frame parts, the two frame parts not being aligned at right angles to the axis of rotation of the folding articulation.

FIG. 1.1 shows a top view and FIG. 1.2 shows a perspective view an exemplary embodiment of the locking device with locking mechanism for two tubular steering rod sections 1 and 2 that are interconnected by means of a folding articulation, in the open state.

The folding device exhibits two elements 4 and 5 that are rotatably connected by means of an axis 3 of rotation, which elements are designed as hinge elements 4a and 5a on one side of the steering rod section and are designed, on the side of the steering rod sections 1 and 2 opposite the hinge elements, as supporting element 4b and as clamping element 5b. In this exemplary embodiment, the hinge elements 4a respectively 5a and the supporting element 4b respectively the clamping element 5b together with a plate 4c respectively 5c in each case form an integral component 4 respectively 5, that has been produced as one piece and that is connected to the respective steering rod section 1 respectively 2. A locking assembly is rotatably connected to the supporting element 4b and contains the following constituents:
a. a round nut 6 that is rotatably arranged in a round recess of the supporting element 4b,
b. a threaded rod 7 that is screwed into the round nut 6 and exhibits a thread on each on its two ends,
c. a pressure element 8 that is plugged onto the threaded rod 7 and exhibits a recess that is intended for the threaded rod 7,
d. a setting nut 9 that is screwed onto the threaded rod 7.

FIGS. 2.1 to 2.5 show in the top view the steps for locking the folding device from the open state in FIG. 2.1 to the locked state in FIG. 2.5. For a clearer representation, the thread between the round nut 6 and the threaded rod 7 is only shown in FIG. 2.1.

The element 5 exhibits a curved clamping surface 5d that is arranged eccentrically relative to the axis of rotation of the locking assembly and is designed in FIGS. 1.1, 1.2 and FIGS. 2.1 to 2.5 as an outer cylinder surface. In the open state, the pressure element 8 maintains contact to the outer cylinder surface 4c of the supporting element 4b (FIG. 2.1). By rotating the locking assembly, this contact is lost (FIG. 2.2). If the locking assembly is rotated further, the pressure element 8 comes into contact with the clamping surface 5d of the clamping element 5b (FIG. 2.3). By further rotating, the pressure element 8 is braced against the clamping surface 5d, FIG. 2.4 showing the largest possible bracing. Here, the threaded rod lies on the line connecting the axis of rotation of the locking assembly and the center axis of the clamping surface 5d. If the locking assembly is now rotated still a bit further, as in FIG. 2.5, the movement of the locking assembly tends inward against the steering rod section, this already producing a self-securing locking.

The advantage of this arrangement consists in the fact that the distance of the central axis of the outer cylinder surfaces of the supporting element 4b and clamping element 5b is so small that the pressure element 8 comes into contact with the clamping element 5b at a very early stage and thus a long clamping displacement can be used for bracing.

FIGS. 3.1, 3.2, and 3.3 show different views of the folding device in the closed state. To protect the locking assembly further against inadvertent rotation the pressure element 8 exhibits a bore 8a such that the threaded rod 7 lies open in a part area, whereby a retaining element 10, in this case a leaf spring that is designed in the shape of a hook at its end and is connected to the steering rod section 2, can grip around the threaded rod 7 and secures the locking assembly against rotation.

In the open state the setting screw 9 can be used to set the desired distance between the pressure element 8 and the round nut 6 and thus to set, in the locked state, the tension that is desired between the pressure element 8 and the clamping element 5b.

The element 5 exhibits two clamping surfaces 5d that are arranged on both sides of the threaded rod 7, so that the pressure element 8 that is supported on the setting screw 9 exerts a pressure on the clamping element 5b on both sides.

The elements 4 and 5 are manufactured from the same extruded profile, wherein even the extruded profile exhibits the round recesses for taking up the hinge axis and the round nut 9, the clamping surface 5d that is formed as an outer cylinder surface and is arranged eccentrically relative to the hinge axis, and the outer cylinder surface 4d that is correspondingly formed. This enables a particularly cost-effective manufacture of the folding device.

FIGS. 3.1, 3.2, and 3.3 reveal the cost-effective further processing of the extruded profiles for manufacturing the folding device: After the extruded profiles have been cut to length, recesses are to be provided that fit into the corresponding counter pieces.

By appropriately cutting to length, a surface 4e respectively 5e can be produced non-parallel to the extrusion direction and thus to the hinge axis 3 that is positively connected to the steering rod sections at right angles to their axis (possibly assisted by a center bore that is produced on the surfaces 4e respectively 5e). The desired folding direction is set by the orientation of the inclined surface 4e respectively 5e.

FIG. 4 shows a view of a further exemplary embodiment of the folding device with locking mechanism with two hinge elements 11 and 12, a separate supporting element 13 and a separate clamping element 14 that are connected to two frame parts, of which one frame part 15 is indicated here.

In this embodiment, too, supporting, clamping, and hinge elements 11, 12, 13 and 14 are manufactured from an identical extruded profile. As shown in FIG. 4 the extruded supporting, clamping, and hinge elements 11, 12, 13 and 14 are cut to length at a non-perpendicular angle relative to the axis 3 of rotation of the folding device. The upper side of the frame part 15 runs parallel to the cut surface of the extruded elements. In this way the frame parts can also be arranged so that they run non-perpendicular relative to the axis 3 of rotation of the folding hinge. The axis 3 of rotation for the folding hinge is formed by a bolt 20 that is provided with a screw head and an inside thread and is screwed to a screw 21. So that rotation of the planes of the hinge elements 11 and 12, which planes are inclined relative to the axis of rotation, is enabled, correspondingly beveled washers 22 are arranged between the inclined planes and the bolt 20 respectively the screw 21.

The invention claimed is:

1. A folding device for a bicycle for connecting a first component and a second component of a frame or of a steering rod, comprising:
    a first hinge element disposed on a hinge side of the first component;
    a second hinge element disposed on a hinge side of the second component, the first hinge element and the second hinge element being rotatably connected about a common axis; and
    a locking mechanism disposed opposite the hinge side of the first component comprising
        a supporting element connected with the first component,
        a locking assembly rotatably connected to the supporting element, and
        a clamping element connected to the second component, the clamping element having a clamping surface which is outwardly curved and cylindrical,
    wherein the locking assembly is coming into contact with the clamping surface when the locking assembly is rotated towards the clamping surface in a locked state and
    wherein in the locked state the locking assembly exerts a force onto the clamping surface, causing the first component and the second component to be firmly connected, and
    wherein the clamping surface is arranged eccentric relative to a rotational axis of the locking assembly and in the locked state the rotational axis of the locking assembly lies inside a circle that is defined by a radius of curvature of the clamping surface.

2. The folding device as in claim 1,
    wherein the first hinge element and the supporting element are separate components connected to the first component, and
    wherein the second hinge element and the clamping element are separate components connected to the second component.

3. The folding device as in claim 1,
    wherein the first hinge element, the supporting element and a first plate are formed as an integral first component to which the first component is connected, and
    wherein the second hinge element, the clamping element and a second plate are formed as an integral second component to which the second component is connected.

4. The folding device as in claim 1, wherein the locking assembly comprises:
    a round nut that is rotatably arranged in a round recess of the supporting element;
    a threaded rod having threads on each on its two ends, one end of the threaded rod being screwed into the round nut;
    a pressure element attached onto the threaded rod, the pressure element having a recess for accepting the threaded rod; and
    a setting nut that is screwed onto the threaded rod,
    wherein the clamping element comprises two clamping surfaces of which one is arranged above and one is arranged below the threaded rod and
    wherein the setting nut in the locked state exerts force onto the pressure element, which in turn exerts force onto the clamping surfaces of the clamping element.

5. The folding device as in claim 4,
    wherein the pressure element comprises a bore that is orthogonal to the rotational axis of the locking assembly in the supporting element and is orthogonal to a longitudinal axis of the threaded rod, such that the threaded rod is exposed in an area of the bore,
    further comprising a retaining element which grips around the threaded rod in the locked state such that the locking assembly is held in the locked state.

6. The folding device as in claim 5, wherein the retaining element is shaped as a hook.

7. The folding device as in claim 5, wherein the retaining element comprises a restoring spring.

8. The folding device as in claim 1, wherein the supporting element and the clamping element are manufactured from an identical extruded profile.

9. The folding device as in claim 1, wherein the first hinge element and the second hinge element are manufactured from an identical extruded profile.

10. The folding device as in claim 1, wherein the first hinge element, the second hinge element, the supporting element and the clamping element are manufactured from an identical extruded profile.

11. The folding device as in claim 3, wherein the integral first component and the integral second component are manufactured from an identical extruded profile.

* * * * *